(12) United States Patent
Libsch et al.

(10) Patent No.: US 12,523,628 B2
(45) Date of Patent: Jan. 13, 2026

(54) 2D NANOPARTICLE DETECTION AND MOTION SENSING

(71) Applicant: International Business Machines Corporation, Armonk, NY (US)

(72) Inventors: Frank Robert Libsch, White Plains, NY (US); Venkat K. Balagurusamy, Airmont, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 18/216,944

(22) Filed: Jun. 30, 2023

(65) Prior Publication Data

US 2025/0003914 A1    Jan. 2, 2025

(51) Int. Cl.
    *G01N 27/22*    (2006.01)
(52) U.S. Cl.
    CPC .................................. *G01N 27/226* (2013.01)
(58) Field of Classification Search
    None
    See application file for complete search history.

(56) References Cited

U.S. PATENT DOCUMENTS

| | | | |
|---|---|---|---|
| 8,614,707 B2 | 12/2013 | Warsito et al. | |
| 9,689,863 B2 * | 6/2017 | Yu | B01L 3/502761 |
| 10,422,672 B1 * | 9/2019 | Libsch | G01F 1/584 |
| 10,444,045 B2 * | 10/2019 | Libsch | G01N 27/226 |
| 10,830,724 B2 | 11/2020 | Libsch et al. | |
| 2013/0008536 A1 | 1/2013 | Wrobel et al. | |
| 2013/0085365 A1 | 4/2013 | Marashdeh et al. | |

(Continued)

FOREIGN PATENT DOCUMENTS

WO    2025/002698 A1    1/2025

OTHER PUBLICATIONS

Yang, W.Q., "Electrical capacitance tomography with square sensor", 1st World Congress on Industrial Process Tomography, Apr. 14-17, 1999, pp. 313-317.

(Continued)

*Primary Examiner* — Justin N Olamit
(74) *Attorney, Agent, or Firm* — Scully, Scott, Murphy & Presser, P.C.; Samuel Waldbaum

(57) ABSTRACT

Devices and methods for detecting the presence and/or monitoring a movement of an analyte contained in a medium. More specifically, a microcapacitive sensing system is provided that includes a planar micro-capacitive sensor array for detecting the presence of an analyte in a sample media. The sensor structure for sensing recognizing or tracking material movement includes a top planar substrate having a first array non-contacting planar conductive electrodes and a bottom planar substrate having a second array of non-contacting planar conductive electrodes overlapping corresponding aligned electrodes in the first array. The overlapping conducting electrodes are triangular shaped to maximize perimeter-to-area ratio. The first and second planar substrates are parallel and sealed to define a volume therebetween for receiving a medium including the analyte to be detected or monitored. The sensing of movement accomplished by measuring a capacitance change between electrodes in the top substrate and aligned electrodes in the bottom substrate.

18 Claims, 10 Drawing Sheets

(56) References Cited

U.S. PATENT DOCUMENTS

2014/0365152 A1  12/2014  Marashdeh et al.
2019/0277678 A1   9/2019  Libsch et al.
2024/0053244 A1   2/2024  Libsch et al.

OTHER PUBLICATIONS

Bardelli, M., et al., "Epitopemapping by solution NMR spectroscopy", J. Mol. Recognit. 2015, Received Jul. 28, 2014, Revised Oct. 21, 2014, Accepted Nov. 25, 2014, 8 pages.
International Search Report and Written Opinion received in PCT/EP2024/064670 dated Sep. 18, 2024, 12 pages.
"First Antigen Rapid Test for Ebola through Emergency Assessment and Eligible for Procurement", Ebola detection by rapid Antigen-Antibody interaction—Corgenix, WHO, Feb. 19, 2015, 04 pages, http://www.who.int/medicines/ebolatreatment/1st_antigen_RT_Ebola/en/.

* cited by examiner

2D NANOPARTICLE DETECTION AND MOTION SENSING

FIELD OF THE DISCLOSURE

The present application relates to devices, systems and methods for detecting the presence and/or movement of an analyte. More specifically, the present application is directed to a structure and system that includes a micro-capacitive image sensor array for detecting the presence and/or movement of a scaled material such as viruses, bacteria, cells, nanoparticles, or other molecules or formations.

BACKGROUND

There is a whole range of principles and techniques that can be exploited in process tomography and tomographic imaging systems including electrical methods based on impedance measurement, ultrasound magnetic resonance, optical methods and those based on ionizing radiation (X- and gamma rays). Ionizing radiation methods produce images with the highest definition but are relatively slow and not mobile for in-field use. Optical method particle size detection is limited to the diffraction limit of the light wavelength used, >0.5 µm.

Electrical tomography systems and methods yield low-resolution images not suitable for nanosize particles but are much faster, robust and relatively inexpensive.

Currently, as shown in FIG. 1, electrical capacitance imaging (ECI) systems such as sensoring system 50 have been designed for use with circular (i.e., out of plane) sensor electrodes 52 normally having 6, 8, 12, or 16 electrodes surrounding a fluidized bed or bubble column 55 to visualize volume flows with a 3D placement of sensors. These electrodes 52 need n(n−1)/2 independent capacitance measurements to image movement.

SUMMARY

In one aspect of the present disclosure, a micro-capacitive sensor array structure and sensing method is provided adapted for 2-Dimensional (2D) nanoparticle size capacitance image sensing.

The micro-capacitive sensor array structure and method senses material type and movement, especially minute particles/materials such as viruses, bacteria, cells, nanoparticles, or other molecules or formations that encompass a different dielectric constant than that of surrounding media.

Further, there is provided a device/chip structure pushing the particle sensing size limit down for sensing minute particles/materials such as viruses, bacteria, cells, nanoparticles, or other molecules via electrical impedance/capacitance.

The micro-capacitive sensor array can include a structure that maximizes the sensor electrode perimeter-to-area ratio and fill factor to give the best signal-to-noise ratio (SNR) and spatial resolution tradeoff.

The invention relates to the data sensor in electrical tomography systems that are: higher resolution, larger signal-to-noise ratios (accuracy), quicker in doing image reconstruction, lending itself to real time image movement and analysis; and requires fewer measurements/per image.

In one aspect of the disclosure, there is provided a micro-capacitive sensor. The micro-capacitive sensor array comprises: a first two-dimensional (2D) array of non-contacting conductive electrodes in a first electrode plane, each conductive electrode of the first 2D array shaped according to a maximum perimeter-to-area ratio, a second 2D array of non-contacting conductive electrodes in a second electrode plane, each second conductive electrode of the second 2D array shaped according to a maximum perimeter-to-area ratio, wherein the first electrode plane and the second electrode plane are overlapping and parallel, wherein each conductive electrode of the first 2D array is aligned with a corresponding conductive electrode of the second 2D array and are separated to define a channel therebetween for sensing an analyte material between the first electrode plane and the second electrode plane.

In another aspect of the present disclosure, there is provided a system for sensing analyte materials. The system comprises: a micro-capacitive sensor comprising: a first two-dimensional (2D) array of non-contacting conductive electrodes in a first electrode plane, each conductive electrode of the first 2D array shaped according to a maximum perimeter-to-area ratio, a second 2D array of non-contacting conductive electrodes in a second electrode plane, each second conductive electrode of the second 2D array shaped according to a maximum perimeter-to-area ratio, wherein the first electrode plane and the second electrode plane are overlapping and parallel, wherein each conductive electrode of the first 2D array is aligned with a corresponding conductive electrode of the second 2D array and are separated to define a channel therebetween; one or more respective conductive signal lines contacting each of the non-contacting conductive electrodes along a respective single row or a respective single column of the first 2D array of non-contacting conductive electrodes; and a respective one or more respective conductive signal lines contacting each of the non-contacting conductive electrodes along a respective single column or respective single row of the second 2D array of non-contacting conductive electrodes.

In yet another aspect of the present application there is provided a method of manufacturing a micro-capacitive sensor. The method comprises: providing a first insulating substrate; forming on a surface of the first insulating substrate, a two-dimensional (2D) array of first conductive electrodes, each first conductive electrode of the 2D array shaped according to a maximum perimeter-to-area ratio and are spaced apart from one another; forming, on an opposing surface of the first insulating substrate, a respective conductive signal line corresponding to a respective column of first electrodes of the 2D array, a respective conductive signal line connecting to one or more of the first capacitor electrodes along the respective column of the 2D array by a respective via connection formed through the first insulating substrate; providing a second insulating substrate; forming on a surface of the second insulating substrate, a two-dimensional (2D) array of second conductive electrodes, each second conductive electrode of the 2D array shaped according to a maximum perimeter-to-area ratio and are spaced apart from one another; forming, on an opposing surface of the second insulating substrate, a respective conductive signal line corresponding to a respective row of second electrodes of the 2D array, a respective conductive signal line connecting to one or more of the second capacitor electrodes along the respective row of the 2D array by a respective via connection formed through the second insulating substrate; and joining, using an insulator material, the first insulating substrate and the second insulating substrate such that first conductor electrodes of the first 2D array of capacitor electrodes is aligned with corresponding second conductor electrodes of the second 2D array and are separated to define a channel therebetween.

DETAILED DESCRIPTION

Figure 1:
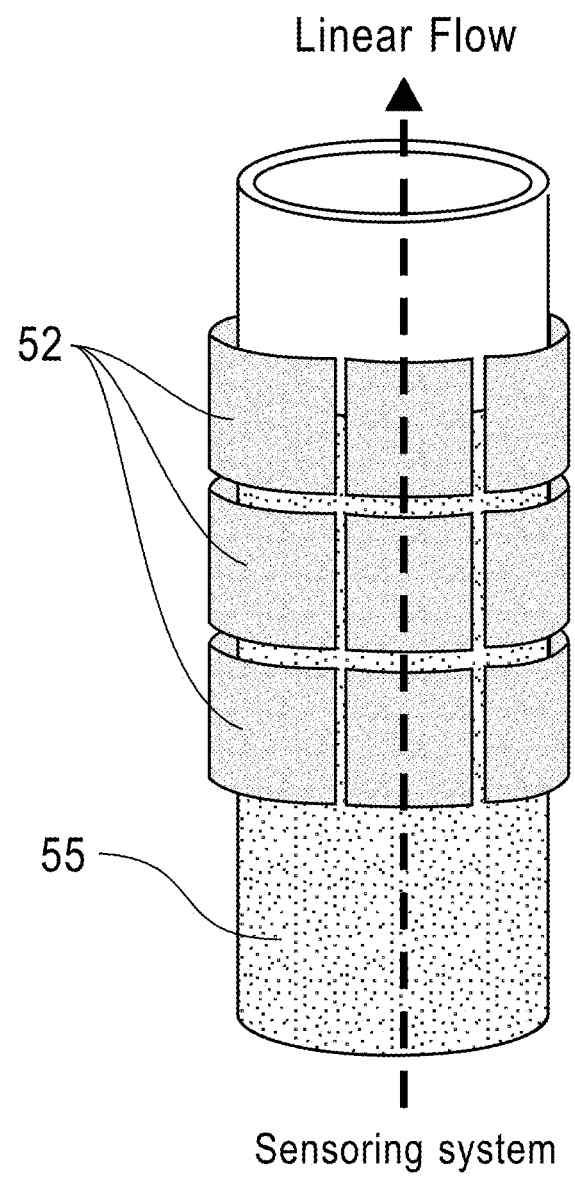
FIG. 1 depicts a conventional electrical capacitance imaging (ECI) system designed for use with circular (i.e., out of plane) sensor electrodes.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 2:
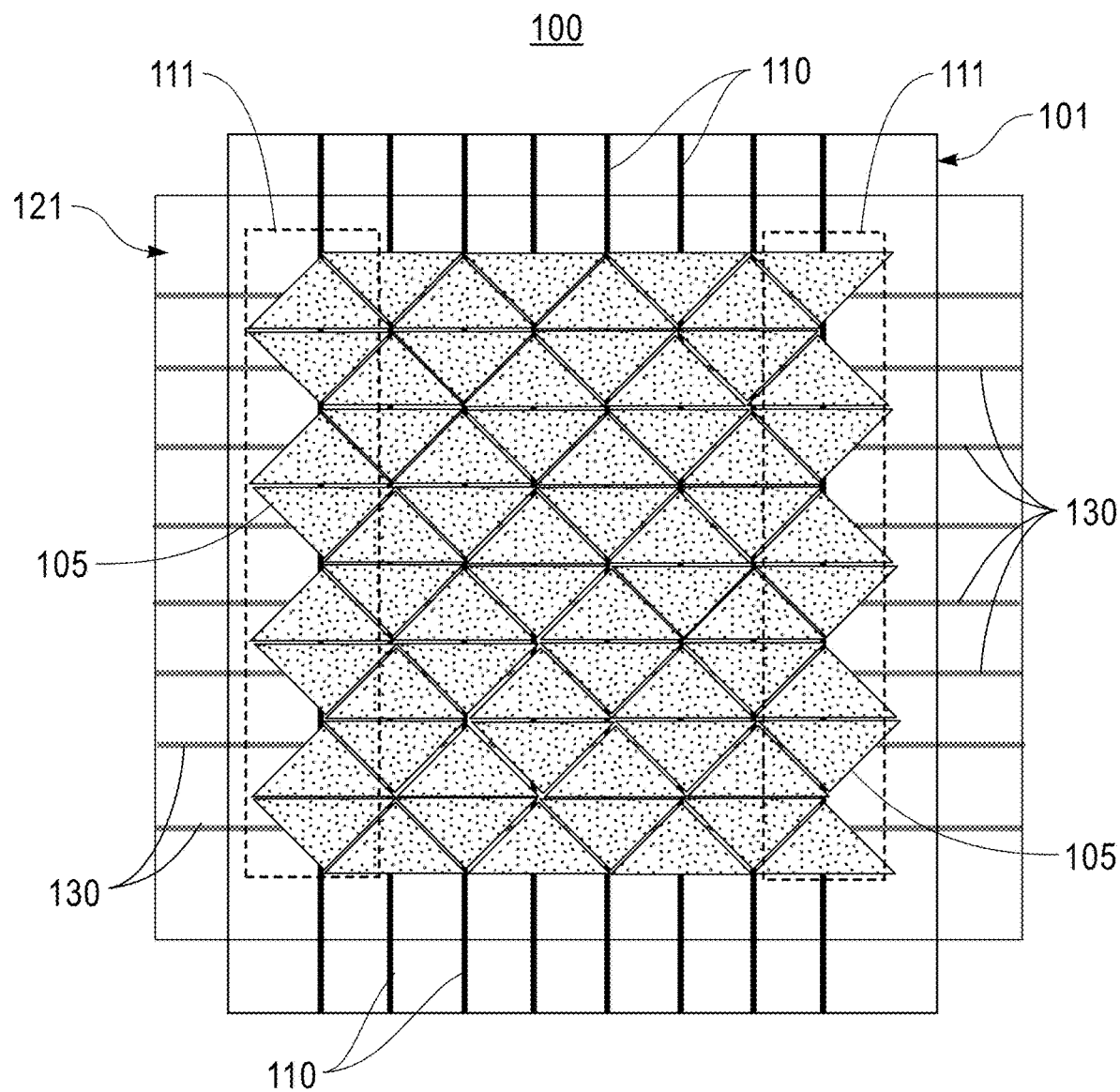
FIG. 2 depicts a top view of a microcapacitor sensor structure for 2D nanoparticle material and movement sensing according to an embodiment of the invention.

FIG. 2 illustrates an exemplary 2D nanoparticle motion sensing structure and method according to an aspect of the present disclosure.

As shown in FIG. 2, there is depicted a top view of a microcapacitor sensor structure 100 for 2D nanoparticle material and movement sensing. The sensor structure 100 includes a top insulating substrate 101 including a first two-dimensional (2D) array of conductive planar electrodes 105 oriented in a first electrode plane. The first conductive electrodes 105 are each shaped to provide a maximum perimeter-to-area ratio. In an embodiment, the maximum perimeter-to-area ratio corresponds to a triangular shape. In an embodiment, the maximum perimeter-to-area ratio corresponds to an equilateral triangular shape. Sensor structure 100 further includes a bottom insulating substrate 121 including a corresponding 2D array set (second set) of aligned bottom conductive planar electrodes (not shown) oriented in a second plane. In an embodiment, the insulating substrate 101, 121 can be formed of a glass, a plastic or an organic printed circuit board. Further, in FIG. 2, the first set of electrodes 105 is directly overlapping and aligned with the corresponding set of bottom conductive electrodes. The bottom conductive electrodes are also shaped to provide a maximum perimeter-to-area ratio. In an embodiment, the maximum perimeter-to-area ratio corresponds to a triangular shape.

In an embodiment, to enable sensing of smaller particles and micro-organisms such as bacteria, smaller sensors enable both better accuracies and better resolution. The sensor scaling is conditioned upon limits such as: (1) minimum area sensor feature patterning as dictated by the state of art (microelectronics) fabrication technology, and (2) obtaining the maximum perimeter-to-area or surface area-to-volume ratio in 2D or 3D sensing, respectively, and (3) maximizing the fill factor with the sensor shape. These three requirements provide the best spatial image resolution by increasing perimeter but preserving a minimum area which is proportional to signal capacitance measured.

In an embodiment, it is found that to maximize the ratio perimeter/area, or equivalently, minimize the inverse, that being minimize the area/perimeter (A/P) ratio for an equilateral triangle using S as representative of a minimum semiconductor manufacturing feature size is equal to 0.144 S which is less than a A/P ratio of a square-shaped electrode (=0.25 S) or a A/P ratio of a hexagon-shaped electrode (=0.433 S) or a circle (=0.5 S). Thus, as referred to herein, "maximum perimeter-to-area ratio" refers to triangle-shaped electrode 105, 125 that provides a minimum A/P ratio as compared to other geometrical figures whose corresponding sides have the same minimum dimensional S (feature size) value.

In embodiments, conductive planar electrodes 105 and 125 consists of a metal material, e.g., copper, aluminum, titanium, etc. In embodiments, the conductive planar triangular-shaped electrodes 105, 125 can include transparent conductive films generally in the form of indium tin oxide (ITO), fluorine doped tine oxide (FTO), and doped zinc oxide.

As further shown In FIG. 2, formed at or on the top substrate 101, there is depicted a plurality of interconnect conductive signal lines or external conductive traces 110 ("signal lines"), each signal line 110 oriented along and contacting a plurality of electrodes 105 along a respective single column 111 of electrodes 105. In the non-limiting illustrative embodiment of sensor 100 shown in FIG. 2, there are eight electrodes 105 along a respective column 111 with eight columns of electrodes 105 and corresponding eight external conducive signal lines 110 shown. Along a respective column 111, the electrodes 105 are configured in a series of pairs, e.g., electrodes 105A, 105B, with each pair having a bottom edge facing each other separated by a short insulating gap, and such that each triangular electrode of the pair 105A, 105B has a respective apex pointing in opposed directions and such that the pair covers a square shape area. Similarly, as shown in FIG. 2, formed at or on the bottom substrate 121, there is depicted a plurality of interconnect conductive signal lines or external conductor traces 130 ("signal lines"), each signal line oriented along and contacting a plurality of bottom electrodes (not shown) along a single row. Although not shown, formed in between the top substrate 101 and bottom substrate 121 are one or more dielectric materials. The dielectric materials offer electrical insulation as well as possible isolation from the microfluidic channel formed from a separation, d in FIG. 5, between the top substrate 101 and the bottom substrate 121. These dielectric materials may be common practiced microelectronic films such as silicon dioxide, silicon nitride, low k dielectrics where k is a dielectric constant less than 4, or other films such as polyimides or the like. These dielectric film thicknesses range from nanometers to microns, and typically are 0.1 to 1 micron, dependent on the deposition method and also the needed electrical and chemical barrier from the analyte in the microfluidic channel 175. The separation of the top substrate 101 from the bottom substrate 121 is dependent on the particle size being detected in the analyte in the microfluidic channel 175, but typically ranges several particle size diameters. The particles range from nanoparticles, such as proteins (typically >5 nm) to viruses (typically 0.1 to 0.2 microns or smaller) to bacteria (typically submicron up to 5 microns), to plant or animal cells (typically 10 to 100 microns) to larger particles of interest.

Figure 3:
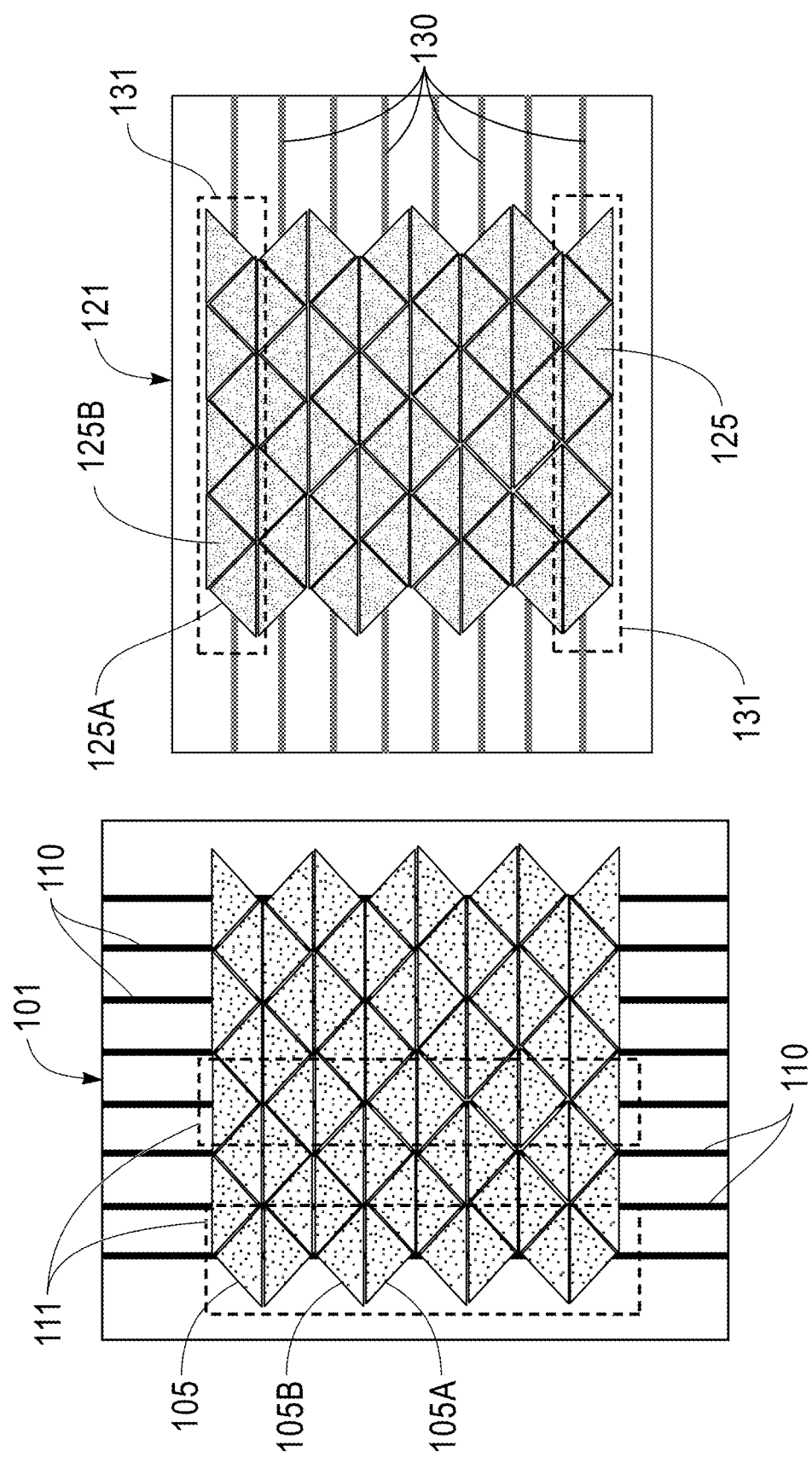
FIG. 3 depicts an exploded view showing the top insulating substrate including a first set of conductive electrodes oriented as a single metal layer in a first plane, and the corresponding bottom insulating substrate including a second set of conductive electrodes oriented as a single metal layer in a second plane.

FIG. 3 shows an exploded view showing the top insulating substrate 101 including a first set of conductive electrodes 105 oriented as a single metal layer in a first plane, and the corresponding bottom insulating substrate 121 including a second set of conductive electrodes 125 oriented as a single metal layer in a second plane. As better shown in FIG. 3, formed at or on the bottom substrate 121, there is depicted a plurality of external conductive signal lines 130, each external signal line 130 oriented along and contacting a plurality of electrodes 125 along a respective single row 131 of electrodes 125. In the non-limiting illustrative embodiment shown in FIG. 3, there are eight electrodes 125 along a respective row 131 with eight rows of electrodes and corresponding eight external conductors 130 shown. Along a respective row 131, the electrodes 125 are configured in a series of pairs, e.g., electrodes 125A, 125B, with each pair having a side edge facing each other separated by a short insulating gap, and such that each triangular electrode of the pair 125A, 125B has a respective apex pointing in opposed directions and such that the pair covers a parallelogram shape area. In FIG. 3, in any particular row or column 111, 131 of electrodes, each conductive electrode is electrically insulated from any other electrode and the rows and columns of triangular-shaped electrodes in the 2D array on each substrate are in a close-packed structure for maximum electrode coverage.

In an embodiment, there is provided n/2 electrodes in each of the top substrate and bottom substrates. In this configuration, the number of independent capacitance measurements available is n/2 for a total of n electrodes. Superimposing the top insulating substrate 101 over the bottom insulating substrate 121 yields the structure 100 of FIG. 1.

Figure 4:
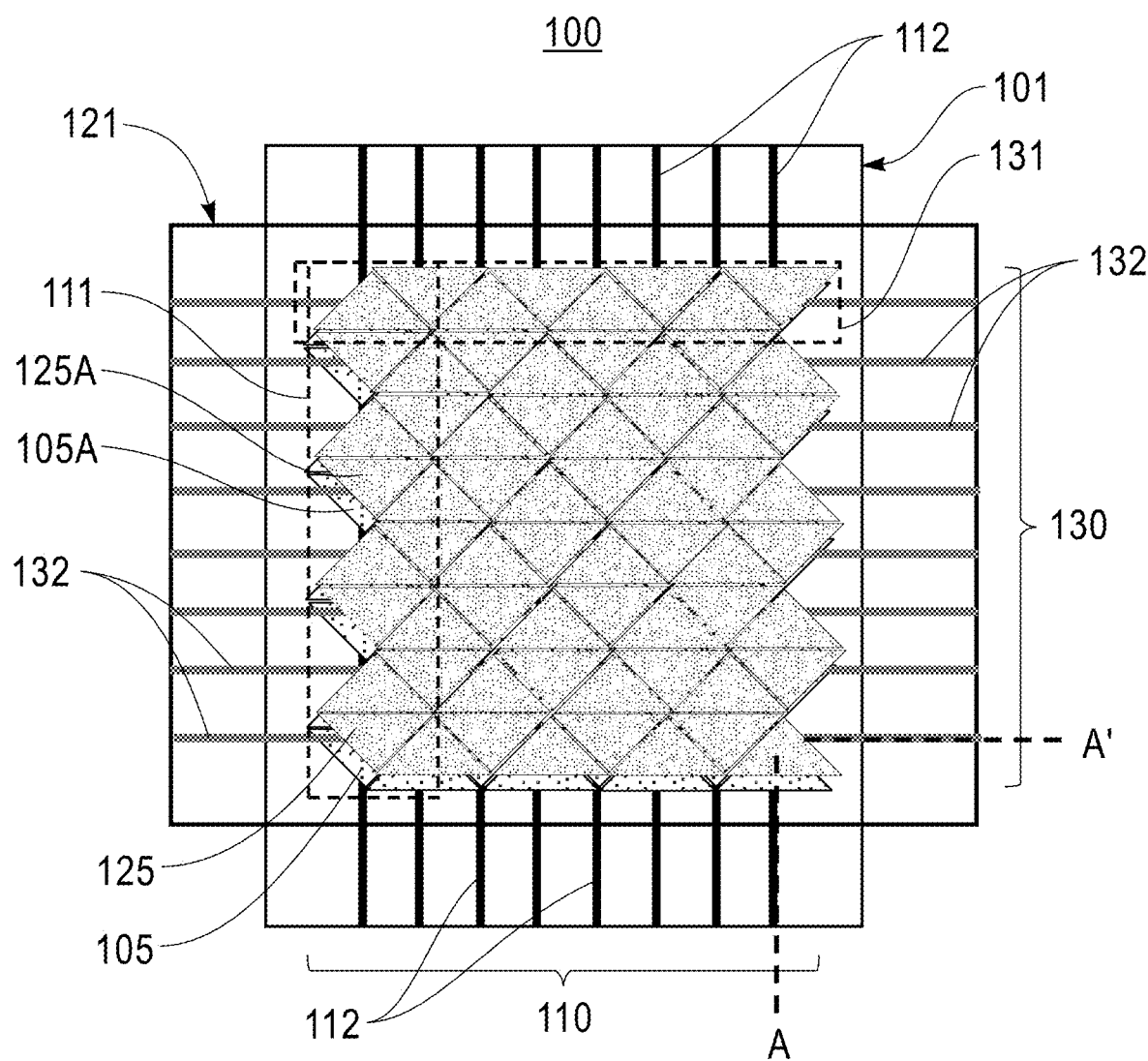
FIG. 4 shows a bottom view of the assembled microcapacitor sensor structure of FIG. 2 however, with the assembled substrates shown as being slightly offset between top and bottom substrate showing a slight offset in the overlap of the first set of top substrate electrodes and second set of bottom substrate electrodes for ease of illustration.

FIG. 4 shows a bottom view of the assembled microcapacitor sensor structure 100 of FIG. 2, however, with the assembled substrates shown as being slightly offset between top and bottom substrate showing a slight offset in the overlap of the first set of top substrate electrodes 105 and second set of bottom substrate electrodes 125 for ease of illustration. In embodiments, each individual planar top electrode 105 of the set of electrodes in the top substrate 101 directly overlap and align with a corresponding individual planar bottom electrode 125 of the set of electrodes in the bottom substrate 121.

In embodiments, as shown in FIG. 4 depicting a slightly offset bottom to top view for instructional purposes, the 2D arrays of individual aligned pairs of overlapping top electrode, e.g., electrode 105A and aligned bottom electrode, e.g., bottom electrode 125A, form a capacitive microsensor 100. The 2-dimensional array of all planar top electrodes 105 and corresponding aligned planar bottom electrodes 125 form a microsensor that is used to image a dielectric permittivity flow change which can be used to monitor, identify and/or track movement of particles or organisms including but not limited to: very small particles (e.g., nanoparticles <200 nm), small molecules, biomarkers, DNA, proteins, or organisms such as the bacteria, viruses, plant cells, animal cells, or other molecules or formulations that encompass a different dielectric constant than that of a surrounding media. The 2D placement of electrodes 105, 125 can perform n/2 independent capacitance measurements to image particle or organism movement. However, the 100 sensor is scalable to large size scaling applications (e.g., such as detecting % water/water like fluids within oil or gas pipelines, flows in pneumatic conveying and imaging flames in combustion, gravitational flows in silos, immiscible liquid mixtures such as different chemicals one of which can be a contaminant etc.

In the embodiment of FIG. 4, although not shown, at each planar top electrode along a respective column 111 of electrodes there is a single contact per output, i.e., one electrode column per output contact. That is, along each respective column of electrodes 105 a single signal line or trace 112 contacts each electrode 105 along the respective column. That is, along each respective column of electrodes 105 a single signal line 112 contacts each electrode 105 along the column to capture and convey detected changes in relative permittivity between any aligned pair of electrodes 105, 125 along that column. Similarly, at each planar bottom electrode along a respective row 131 of electrodes there is a single contact per output, i.e., one electrode row per output contact. That is, along each respective row of electrodes 125 a single signal line or trace 132 contacts each electrode 125 along the row to capture and convey detected changes in relative permittivity between any aligned pair of electrodes along that row. Thus, in the example embodiment depicted in FIG. 4, the number of independent capacitance or detected changes in relative permittivity available is n/2/8, where n/2 is the total number of planar top electrodes (e.g., 64) or planar bottom electrodes (e.g., 64).

Figure 5:
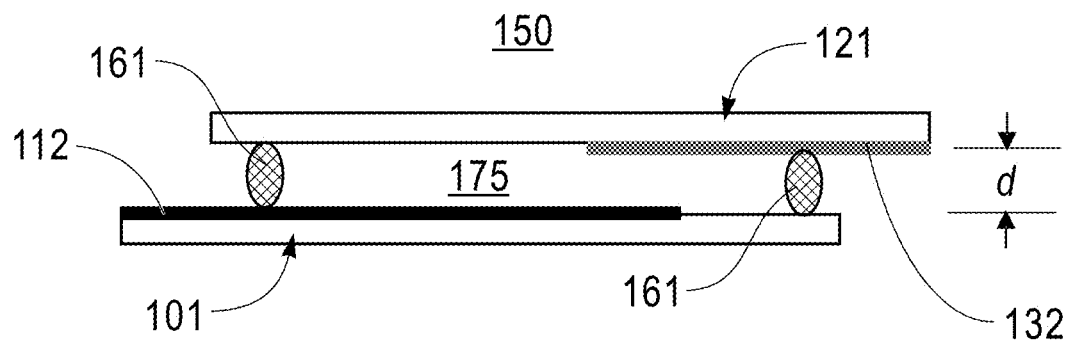
FIG. 5 depicts a cross-sectional view of a portion of the microcapacitor sensor structure of FIG. 4 taken along a cross-section line A-A'.

FIG. 5 depicts a cross-sectional view of a portion 150 of the microcapacitor sensor structure 100 of FIG. 4 taken along a cross-section line A-A'. As depicted in FIG. 5, the top substrate 101 is shown underneath bottom insulating substrate 121 and shown including a portion of the external conductive signal line 112 oriented in a first plane. The second substrate 121 is shown including a portion of an external conductive signal line 132 oriented in a second plane parallel to the first plane. As shown in FIG. 5, there is shown spaced apart one or more formed insulative spacer structures, e.g., forming a ring or gasket 161, bonding the top substrate 101 to bottom substrate 121 and allowing for a separation or channel between the top substrate 101 bottom substrate 121. The insulative spacer structures or gasket 161 can be an epoxy or any insulator structure functioning as a sealant and designed to seal an area within which a fluid media having particle or organisms is input for capacitive sensing. The insulative spacer structures or gasket 161 can be formed at or near peripheral edges of each top and bottom substrate to define a cavity or channel 175 between the top substrate 101 and bottom substrate 121 within which a fluid media is contained or flows. The gasket 161, for example, can have two discontinuities in an otherwise continuous seal to allow for an analyte side analyte inlet port and an analyte exit port (not shown). The gasket 161, as a second example, can have a continuous seal circumventing the electrodes 105, 125, with the analyte inlet port(s) and outlet port(s) being through holes from the top substrate 101, the bottom substrate 121, or both (not shown).

In an embodiment, the distance between the bottom and top substrates and corresponding distance between respective electrodes 105, 125 is commensurate with the size of particles or organisms being micro-capacitively detected and the distance d can range from sub-micron or smaller to millimeters or greater.

Figure 6:
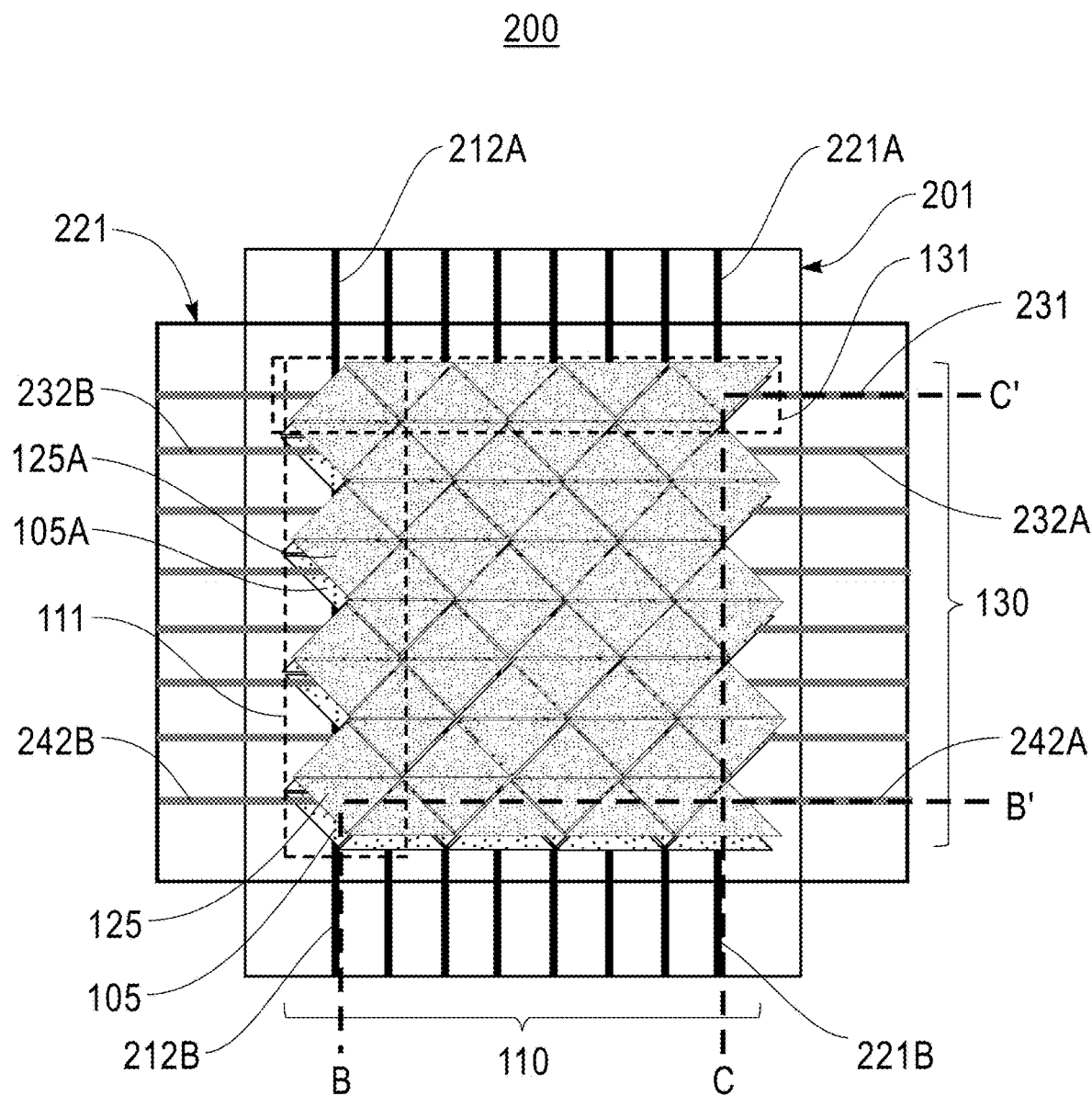
FIG. 6 shows a bottom view of a second embodiment of an assembled microcapacitor sensor structure including top substrate of triangular-shaped planar electrodes and bottom substrate of triangular-shaped planar electrodes.

FIG. 6 shows a bottom view of a second embodiment of an assembled microcapacitor sensor structure 200 including top substrate 201 of triangular-shaped planar electrodes 105 and bottom substrate 221 of triangular-shaped planar electrodes 125. In the view depicted in FIG. 6, the assembled substrates 201, 221 are shown as being slightly offset between top and bottom substrate such that there is a slight mismatch in the overlap of the first set of top substrate electrodes 105 and second set of bottom substrate electrodes 125 for ease of illustration. In embodiments, each individual electrode 105 of the set of electrodes in the top substrate 201 directly overlap and align with a corresponding individual electrode 125 of the set of electrodes in the bottom substrate 221.

In embodiments, as shown in FIG. 6 depicting a slightly offset bottom to top view for instructional purposes, the 2D arrays of individual aligned pairs of overlapping planar top electrode, e.g., electrode 105A and a bottom electrode, e.g., planar bottom electrode 125A, form a capacitive microsensor 100. The 2-dimensional array of all planar top electrodes 105 and corresponding aligned planar bottom electrodes 125 form a capacitive microsensor that is used to image a dielectric or permittivity flow change which can be used to monitor, identify and/or track movement of particles or organisms. The 2D placement of electrodes 105, 125 can perform n/2 independent capacitance or detected changes in relative permittivity measurements to image particle or organism movement. However, the sensor is scalable to large size scaling applications.

In the embodiment of FIG. 6, although not shown, at each respective column 111 of planar top electrodes 105 there is two electrically connecting electrode signal lines per column. That is, for each respective column 111 of planar top electrodes 105, there is connected a first external conductive signal line 212A to one-half of the electrodes in the column 111 (e.g., four electrodes in the embodiment shown) via respective interconnect via or thru-via connection, and there is connected a second external conductive signal line 212B to the remaining one-half of the electrodes in the same column 111 via respective interconnect via or thru-via connection at each. That is, along each respective column of electrodes 105 a first conductive signal line 212A contacts each of one-half of the electrodes 105 along the column to capture and convey detected changes in relative permittivity between any aligned pair of electrodes 105, 125 from any of the one-half electrodes along that column and a second signal line 212B contacts each of the remaining one-half of the electrodes 105 along the column 111 to capture and convey detected changes in relative permittivity between any aligned pair of electrodes 105, 125 from the remaining electrodes along that column.

Similarly, at each respective row 131 of planar bottom electrodes 125 there is two connecting electrode signal lines per row. That is, along each respective row 131 of electrodes 125, there is connected a first electrode signal 232A providing output contact to a thru via connection at each electrode of the first one-half of the electrodes in the row 131 (e.g., four electrodes in the embodiment shown) and a second electrode signal line 232B providing output contact to a thru via connection at each electrode of the remaining one-half of the electrodes in the same row 131. That is, along each respective row of electrodes 125 a first signal line 232A contacts each of one-half of the electrodes 125 along the row to capture and convey detected changes in relative permittivity between any aligned pair of electrodes 105, 125 from any of the one-half electrode pairs along that row and a second signal line 232B contacts each of the remaining one-half electrodes 125 along the row 131 to capture and convey detected changes in relative permittivity between any aligned pair of electrodes 105, 125 from the remaining paired electrodes along that row.

In an embodiment depicted in FIG. 6, there is provided n/2 electrodes in each of the top substrate and bottom substrates. In this configuration, the number of independent capacitance measurements available is n/2, where n/2 is the total number of planar top electrodes (e.g., 64 in the illustrative embodiment) or planar bottom electrodes (e.g., 64). Superimposing the top insulating substrate 101 over the bottom insulating substrate 121 yields the structure 100 of FIG. 1.

Figure 7A:
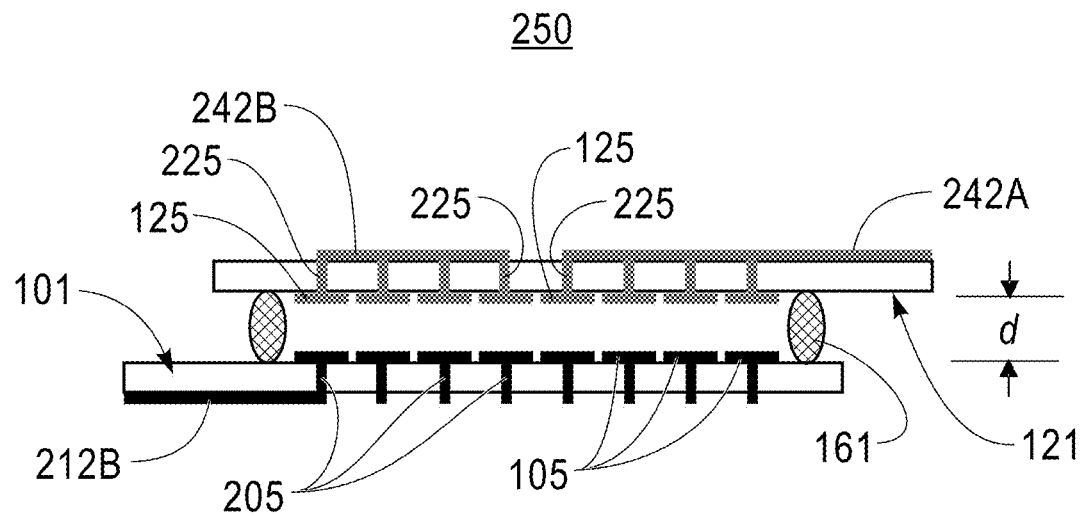
FIG. 7A depicts a cross-sectional view of a portion of the microcapacitor sensor structure of FIG. 6 taken along a cross-section line B-B'.

FIG. 7A depicts a cross-sectional view of a portion 250 of the microcapacitor sensor structure 200 of FIG. 6 taken along a cross-section line B-B'. As depicted in FIG. 7A, the top substrate 101 is shown underneath bottom insulating substrate 121. In the cross-section taken along line B-B' of FIG. 6, there is shown a dual metal layer substrate structure 101 including a first layer of top planar electrodes 105 (e.g., eight planar electrodes along a row in the illustrative embodiment) along a bottom surface of substrate 101, each electrode having a conductive contact through via connection 205 extending from the electrode 105 through the substrate 101 to an opposite surface of the substrate. In the cross-section of FIG. 7A taken along line B-B' of FIG. 6, one of the planar top electrodes 105 has a through via connection 205 connecting the single external second signal line 212B at the opposite surface of the substrate (other metal layer).

As further depicted in FIG. 7A, in the cross-section taken along line B-B' of FIG. 6, the dual metal layered bottom substrate 121 is shown above the top insulating substrate 101. There is further shown a dual metal layer substrate 101 including a first layer of bottom planar electrodes 125 (e.g., eight planar electrodes along a row in the illustrative embodiment) along a top surface of substrate 121, each bottom planar electrode 125 having a conductive contact through via connection 225 extending from the electrode 125 through the substrate 121 to an opposite surface of the substrate (other metal layer). A first one-half of the planar bottom electrodes 125 (e.g., four electrodes) have their respective conductive thru via connections 225 connecting a first single external signal line 242A and the remaining one-half of the planar bottom electrodes 125 (e.g., remaining four electrodes) have their respective thru via connections 225 contacting a separate single external signal line 242B.

Figure 7B:
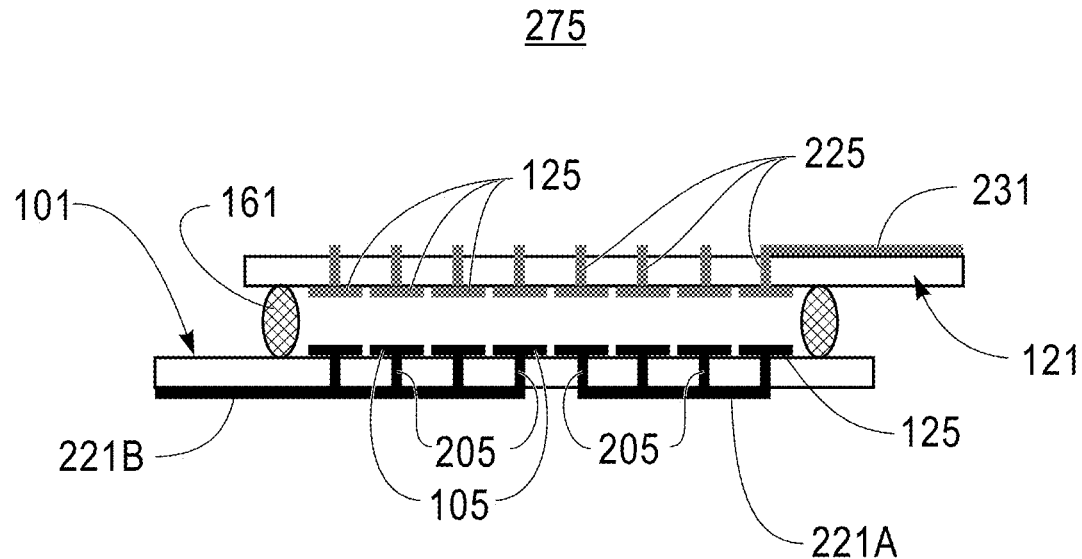
FIG. 7B depicts a cross-sectional view of a portion of the microcapacitor sensor structure of FIG. 6 taken along a cross-section line C-C'.

FIG. 7B depicts a cross-sectional view of a portion 275 of the microcapacitor sensor structure 200 of FIG. 6 taken along a cross-section line C-C'. As depicted in FIG. 7B, the top substrate 101 is shown underneath bottom insulating substrate 121 with both substrates configured as having dual metal layers. In the cross-section taken along line C-C' of FIG. 6, there is shown planar top electrodes 105 (e.g., eight planar electrodes along a row in the illustrative embodiment) along a bottom surface of substrate 101, each electrode having a conductive contact through via connection 205 extending from the electrode 105 through the substrate 101 to an opposite surface of the substrate. In the cross-section of FIG. 7B taken along line C-C' of FIG. 6, a first one-half of the planar top electrodes 105 (e.g., four electrodes) have their respective conductive thru via connections 205 connecting a first single external signal line 221A. Further, the remaining one-half of the planar top electrodes 105 (e.g., remaining four electrodes) have their respective thru via connections 205 connecting a separate single external signal line 221B.

In FIG. 7B depicting the cross-section taken along line C-C' of the microcapacitor sensor structure 200 of FIG. 6, there is further shown planar bottom electrodes 125 (e.g., eight planar electrodes along a column in the illustrative embodiment) along a bottom surface of substrate 121, each electrode 125 having a conductive contact through via connection 225 extending from the electrode 125 through the substrate 121 to an opposite surface of the substrate. In the cross-section of FIG. 7B taken along line C-C' of FIG. 6, one of the planar top electrodes 125 is depicted as having a thru via connection 205 shown as connecting to the single external second signal line 231.

In embodiments depicted in FIGS. 7A, 7B, there is shown spaced apart one or more formed insulative spacer structures or gasket 161 coupling the top substrate to bottom substrate 121 and allowing for a separation between the top substrate 101 bottom substrate 121. These insulative spacer structures or gasket 161 can be an epoxy or any insulator structure functioning as a sealant and designed to seal an area within which a fluid media having particle or organisms is input for capacitive sensing. The distance between the bottom substrate 121 and top substrate 101 and corresponding distance between respective electrodes 105, 125 is commensurate with the size of particles or organisms being micro-capacitively detected and the distance d can range on the order from sub-microns or smaller to millimeters or greater.

Figure 8:
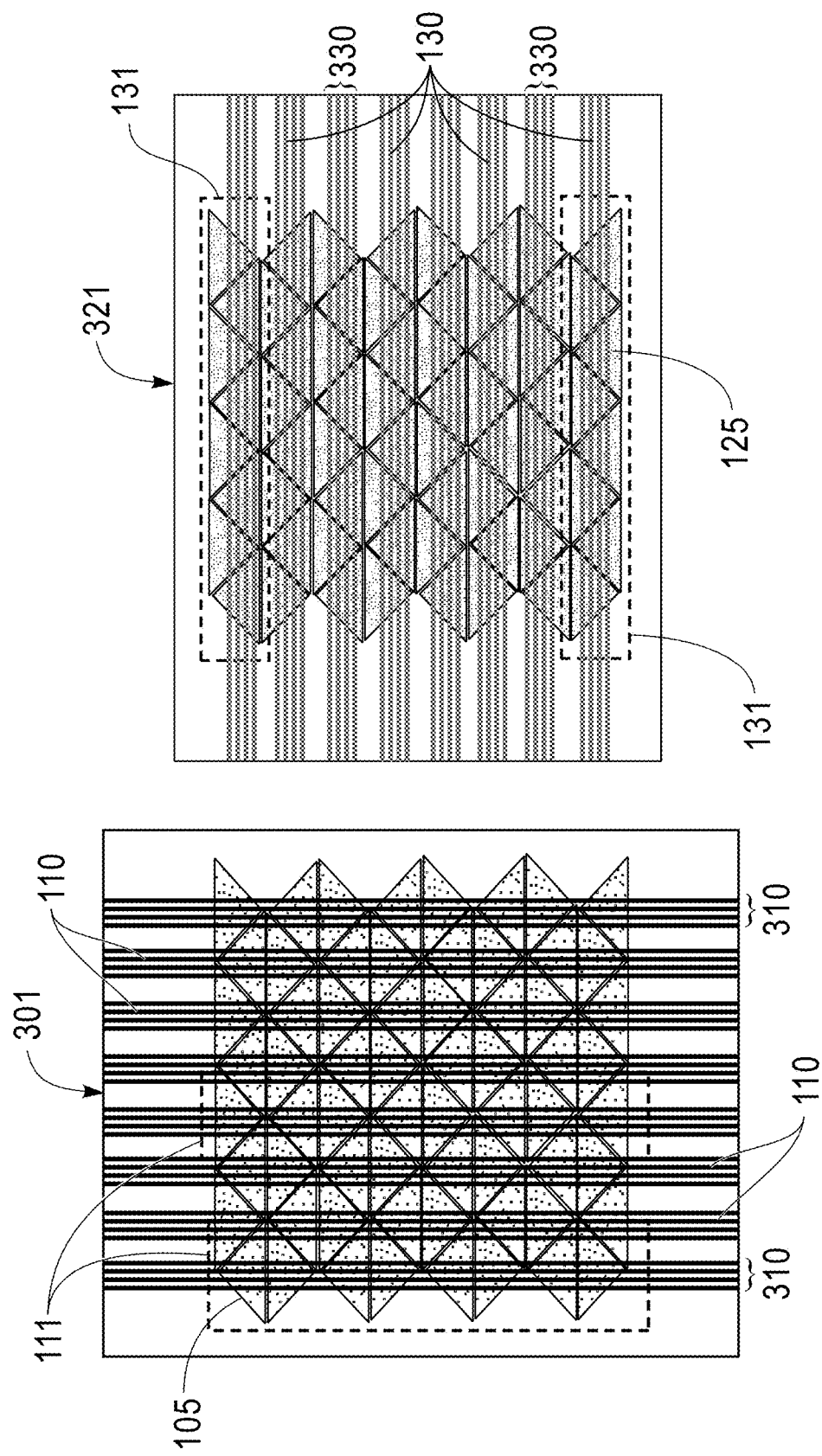
FIG. 8 shows an exploded unassembled view showing a dual metal layer top insulating substrate including a first set of conductive triangular-shaped electrodes oriented as a single metal layer in a first plane and having external electrode signal line connections to each electrode in a second metal layer (second plane)

FIG. 8 shows an exploded unassembled view showing a dual metal layer top insulating substrate 301 including a first set of conductive triangular-shaped electrodes 105 oriented as a single metal layer in a first plane and having external electrode signal line connections 310 to each electrode in a second metal layer (second plane). A corresponding dual metal layer bottom insulating substrate 321 includes a second set of conductive triangular-shaped electrodes 125 oriented as a single metal layer in a first plane and having external electrode signal line connections 330 to each electrode in a second metal layer (second plane).

In an embodiment, as shown in FIG. 8, formed at top substrate 301, there is depicted a plurality of external conductor signal line sets 310, each set 310 connecting to each triangular-shaped electrode 105 along a column 111 of electrodes 105. In an embodiment, there are four external electrode conductive signal lines 110 in a set 310, with each of the four external electrode conductor signal lines oriented along and contacting a plurality of four electrodes 105, and along a respective single column 111 of electrodes 105 one conductive signal line set 310 from the bottom and one conductive signal line set 310 from the top. In the non-limiting illustrative embodiment shown in FIG. 8, there are eight electrodes 105 along a respective column 111 with eight columns of electrodes and corresponding sixty-four external conductors 110 shown. In the non-limiting illustrative embodiment shown in FIG. 8, there are sixteen sets 310, with each set having four electrode connecting signal lines 110 each, with two sets 310 connecting to each electrode along a respective single row 131. In FIG. 8, in any particular column 111 of electrodes, each conductive electrode 105 is electrically isolated from any other electrode.

Likewise, in an embodiment, as shown in FIG. 8, formed at top substrate 321, there is depicted a plurality of external conductor signal line sets 330, two sets 330 of signal lines connecting to each triangular-shaped electrode 125 along a row 131 of electrodes 125. In an embodiment, there are four external electrode conductor lines 130 in a set 330, with two sets of four external electrode conductor lines oriented along and contacting a plurality of electrodes 125 along a respective single row 131 of electrodes 125. In the non-limiting illustrative embodiment shown in FIG. 8, there are eight electrodes 125 along a respective row 131 with eight rows of electrodes and corresponding sixty-four external conductors 130 shown. Thus, in the non-limiting illustrative embodiment shown in FIG. 8, there are eight sets 330, with each set having four electrode connecting signal lines 130 each, with each set 330 connecting to each electrode along a respective single row 131. In FIG. 8, in any particular row 131 of electrodes, each conductive electrode 125 is electrically isolated from any other electrode.

In an embodiment, there is provided n/2 electrodes in each of the top substrate and bottom substrates. In this configuration, the number of independent capacitance or detected changes in relative permittivity measurements available is n/2 for a total of n electrodes.

Figure 9:
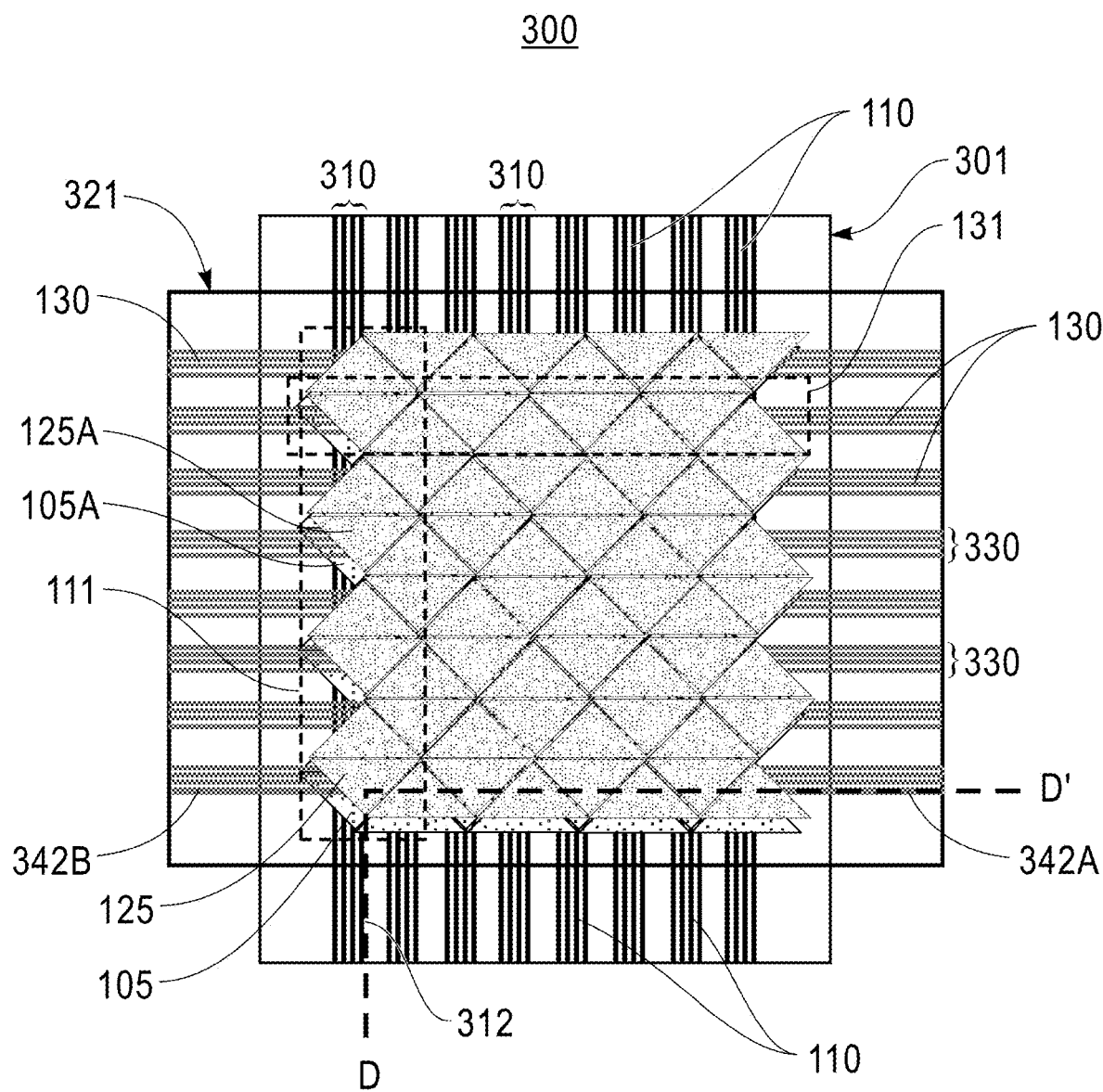
FIG. 9 shows a bottom view of the assembled substrates of FIG. 8 forming microcapacitor sensor structure according to a further embodiment, however, for non-limiting illustrative purposes, the assembled substrates shown as being slightly offset between top and bottom substrate for ease of illustration.

FIG. 9 shows a bottom view of the assembled substrates 301, 321 of FIG. 8 forming microcapacitor sensor structure 300, however, for non-limiting illustrative purposes, the assembled substrates shown as being slightly offset between top and bottom substrate showing a slight offset in the overlap of the first set of top substrate electrodes 105 and second set of bottom substrate electrodes 125 for case of illustration. In embodiments, each individual planar top electrode 105 of the set of electrodes in the top substrate 301 directly overlap and align with a corresponding individual planar bottom electrode 125 of the set of electrodes in the bottom substrate 321.

In embodiments, as shown in FIG. 9 depicting a slightly offset bottom to top view for instructional purposes, the 2D arrays of dual metal layered individual aligned pairs of overlapping top electrode, e.g., electrode 105A and aligned bottom electrode, e.g., bottom electrode 125A, form a capacitive microsensor 300. The 2-dimensional array of all planar top electrodes 105 and corresponding aligned planar bottom electrodes 125 form a microsensor that is used to image a dielectric permittivity flow change which can be used to monitor, identify and/or track movement of particles or organisms. The 2D placement of electrodes 105, 125 can perform n/2 independent capacitance or detected changes in relative permittivity between any aligned pair of electrodes 105, 125 to image particle or organism movement. However, the sensor 300 is scalable to large size scaling applications.

In the embodiment of FIG. 9, at each planar top electrode 105 along a respective column 111 of electrodes there is a single contact per output, i.e., one electrode per output contact. Particularly, along each respective column 111 of electrodes 105 two sets of 310 of four single signal line conductors 110 (i.e., four single signal line conductors 110 from the top and four single signal line conductors 110 from the bottom) contact each individual electrode 105 along the respective column to capture and convey detected changes in relative permittivity between any paired electrodes 105, 125 along that column. Similarly, at each planar bottom electrode 125 along a respective row 131 of electrodes there is a single contact per output, i.e., one electrode row per output contact. Particularly, along each respective row of electrodes 125 a set 330 of two sets of four single signal line conductors 130 (i.e., four single signal line conductors 130 from the left and four single signal line conductors 130 from the right) contact each individual electrode 125 along the respective row 131 to capture and convey detected changes in relative permittivity between any paired electrodes 105, 125 along that row.

In an embodiment depicted in FIG. 9, there is provided n/2 electrodes in each of the top substrate and bottom substrates. In this configuration, the number of independent capacitance measurements available is n/2, where n/2 is the total number of planar top electrodes (e.g., 64 in the illustrative embodiment) or planar bottom electrodes (e.g., 64). Superimposing the top insulating substrate 101 over the bottom insulating substrate 121 yields the structure 100 of FIG. 1.

Figure 10:
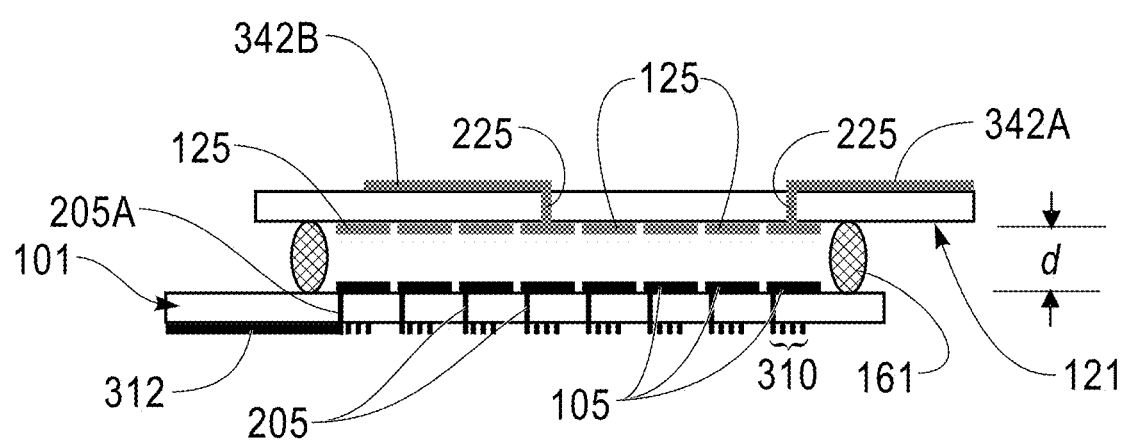
FIG. 10 depicts a cross-sectional view of a portion of the microcapacitor sensor structure of FIG. 9 taken along a cross-section line D-D'.

FIG. 10 depicts a cross-sectional view of a portion 350 of the microcapacitor sensor structure 300 of FIG. 9 taken along a cross-section line D-D'. As depicted in FIG. 10, the top dual metal layer substrate 101 is shown underneath bottom dual metal layer insulating substrate 121. In the cross-section taken along line D-D' of FIG. 9, there is shown a dual metal layer substrate structure 101 including a first layer of top planar electrodes 105 (e.g., eight planar electrodes along a row in the illustrative embodiment) along a bottom surface of the substrate 101, each individual electrode having a conductive contact through a via connection 205 extending from the single electrode 105 through the substrate 101 to an opposite surface of the substrate. In the cross-section of FIG. 10 taken along line D-D' of FIG. 9, one of the planar top electrodes 105 has a set 310 of four interconnect lines on the opposite side of 101, with only one via connection 205 per electrode 105, and one via connection 205A connecting to an individual single external conductive signal line in a group of four external conductive signal lines 312 at the opposite surface of the substrate (other metal layer). It is understood that, at any electrode, each of the respective individual via connections 205 of a set 310 connect to a different respective individual single external conductive signal line.

As further depicted in FIG. 10, in the cross-section taken along line D-D' of the microcapacitor sensor structure 300 of FIG. 9, the dual metal layered bottom substrate 121 is shown above the top insulating substrate 101. There dual metal layer substrate includes a first layer of bottom planar electrodes 125 (e.g., eight planar electrodes along a row in the illustrative embodiment) along a top surface of substrate 121, each bottom planar electrode 125 having one conductive contact through respective via connection 225 extending from the electrode 125 through the substrate 121 to an opposite surface of the substrate (other metal layer). In an embodiment depicted in the view of FIG. 10, each electrode 125 along a row 131 has one conductive thru via connection 225. Shown is one electrode 125 on the left group of four (4) electrodes and one electrode 125 on the right group of four electrodes connecting to a first single external signal line 342B and 342A, respectively.

Various methods can be used in the build of the microcapacitor sensors 100, 200, 300 depicted in FIGS. 4, 6 and 9. In one embodiment, a method includes forming, on a top substrate, a two-dimensional (2D) array of isolated top electrodes 105 of a shape having a maximum perimeter-to-area dimension. In an embodiment, the top electrodes 105 are equilateral triangular shaped and arranged as parallel rows or columns of multiple electrodes. The top substrate 101 can be rigid or flexible and may include an insulating layer on a semiconductor material or an electrically insulating material such as, for example, glass or a polymer. Exemplary semiconductor materials that can be employed in the present application as the top substrate 101 include, but are not limited to, Si, Ge, SiGe, SiGeC, SiC, GaSb, GaP, GaN, GaAs, InAs, InP, AlN, and all other III-V or II-VI compound semiconductors. In one embodiment, the top substrate 101 is comprised of silicon. In one embodiment, the top substrate 101 is comprised of a polyimide. Typically, the top substrate 101 is transparent and is composed of glass or a polymer. The top substrate 101 that is employed in the present application may have a thickness from a few microns to a few millimeters.

The top electrodes 105 can be any number of equilateral triangle-shaped metal electrodes having a maximum perimeter-to-area dimension. The equilateral-triangle shaped metal electrodes are spaced apart and electrically isolated from each other in both row and column dimensions. These triangular-shaped electrodes may have an edge length on the order typically ranging from about 1 nm to 1 cm, but can be larger.

In one embodiment, the top electrodes 105 may be formed within the top substrate 101 by conventional lithography, etching and deposition processes. For example, a photoresist layer may first be formed on the top substrate 101 and exposed to light to form a pattern of triangular-shaped openings therein. An anisotropic etch such as, for example, a reactive ion etch (RIE), may then be performed to form triangular-shaped openings in the top substrate 101 using the patterned photoresist layer as an etch mask. The triangular-shaped openings are then filled with a conductive material such as, for example, gold, silver, nickel, copper, tungsten, aluminum or alloys thereof to provide the top electrodes 105 (and or any top terminal pads). The surface of the structure can be planarized using a planarization process such as, for example, chemical mechanical polishing (CMP). After planarization, the top surfaces of the top electrodes 105 are coplanar with the top surface of the top substrate 101.

In another embodiment, the top electrodes 105 may be formed on the top substrate 101 by blanket depositing a conductive material followed by lithographically etching the conductive material. For example, a conductive material may be first blanket deposited on the top substrate 101 using a conventional deposition process such as, for example, chemical vapor deposition (CVD), physical vapor deposition (PVD), plasma-enhanced vapor deposition (PECVD), or atomic layer deposition (ALD). A photoresist layer may then be formed on the conductive material, and exposed to light to form openings therein. The exposed conductive material may then be removed using RIE, through the openings, to form the top electrodes 105 using the patterned photoresist layer as an etch mask. Subsequently, the patterned photoresist layer may be removed, for example, by ashing. The top surfaces of the top electrodes 105 are thus located above the top surface of the top substrate 101.

In yet another embodiment, the top electrodes 105 may be formed on the top substrate 101 by a lithographically exposed and patterned resist in the intended non-electrode 105 regions followed by blanket depositing a metal seed layer, plating of the metal onto the blanket seed layer, and lift-off of the patterned resist with the seed layer and plated metal in the regions between the intended electrodes 105. The top surfaces of the top electrodes 105 are thus located above the top surface of the top substrate 101.

In instances where the top electrodes 105 are formed on top of the top substrate 101, after formation of the top electrodes 105, an insulator layer may be deposited on top of the top substrate 101 to embed the top electrodes 105. The insulator layer may include a dielectric material such as, for example, silicon dioxide, silicon nitride, or a low dielectric constant (low-k) material such as organosilicate glass; the term "low-k denotes a dielectric material having a dielectric constant of less than silicon dioxide. The insulator layer can be formed, for example, by CVD, PECVD or spin coating. The insulator layer is optional and can be omitted in some embodiments of the present application.

In embodiments, the method includes forming an external conductive signal line or external conductive trace 110 that connects to each electrode along a first direction, e.g., column (or row) direction. In embodiments, the external conductive trace lines 110 extend in a vertical direction (e.g., a y-axis direction) connecting electrodes of a respective column. The external conductive lines connect an electrode along a column to a terminal pad (not shown) that provides external connection of electrodes to an external capacitance sensing/detecting circuit and/or image processing circuit.

In an embodiment of a top electrode substrate 101 including a plurality of top electrodes 105 surrounded by a passivation layer, each of the top electrodes 105 is electrically connected to external conductive line (e.g., that connects to a top terminal pad) via a connection via structure 205.

Each of the thru via structures is an interconnect via 205 connecting to an interconnect conductive line or external conductive traces 110 that electrically connects the interconnect via 205 to a corresponding terminal pad 114 for external connection at an edge of the substrate. In one embodiment, the insulating substrate 101 is on a silicon or glass handler and the side without the handler can proceed where the interconnect via structures 205 external conductive traces 110 and top terminal pads 114 can be formed. A second handler is attached to the side just completed and the first handler removed from the other side of the insulating substrate 101 where forming the metal electrodes 105 followed by a passivation layer. The second handler is now removed. Conductive material for the traces 110 can be of metals such as, for example, copper, tungsten, aluminum or alloys. Conductive materials that are bond compatible for terminal pads 114 can be of metals such as, for example, copper, tin, gold, or alloys. Conductive materials that are coefficient of thermal expansion acceptable for through-vias 205 can be of metals such as, for example, tungsten, copper, or alloys. The traces 110, terminal pads 114 and through-vias 205 are formed with normal well established microelectronics fabrication procedures. It should be noted that the interconnect conductive lines or traces 110 and the top terminal pads may also be formed by a screen printing or stencil printing technique of a suitable conductive paste material. In this case, the top surfaces of the interconnect conductive lines or traces 110 and the top terminal pads are located above the top surface of the insulator layer.

In another embodiment, after forming the top substrate 101, the interconnect structure 205 (and the top terminal pads) may be formed by a dual damascene process known in the art. In this case, the top surfaces of the interconnect conductive lines or traces 110 and the top terminal pads are coplanar with the top surface of the insulator substrate 101.

In embodiments herein, the method of forming the 2D array of planar bottom triangular-shaped electrodes 125 on the bottom substrate 121 is identical as the method of forming of the top electrodes 105 in the top substrate. However, the formed external conductive lines 130 connects to each electrode along a second direction, e.g., row (or column) direction. In embodiments, the external conductive lines 130 extend in a horizontal direction (e.g., an x-axis direction) connecting electrodes of a respective row. The external conductive lines 130 connect an electrode along a row to a terminal pad (not shown) that provides external connection of electrodes to an external capacitance sensing/detecting circuit and/or image processing circuit.

Each exemplary capacitive sensor array 100, 200, 300 can be formed by assembling the top substrate 101 over the bottom electrode substrate 121 with the top electrodes 105 and the bottom electrodes 125 facing each other. The top electrodes 105 and the bottom electrodes 125 intersect, i.e., are directly aligned, forming a plurality of micro-capacitance units. The relative dimensions of the top substrate 101 and the bottom substrate 121 are selected such that the top terminal pads (not shown) are located beyond the edges of the bottom substrate 121 along the y direction, which means that the top terminal pads are not covered by the bottom substrate 121, while the bottom terminal pads are located beyond the edges of the top substrate 101 along the x-direction, which means that the bottom terminal pads are not covered by the top substrate 101.

The top electrode substrate 101 is spaced away from the bottom electrode substrate 121 by a spacer such as a ring or gasket 161. The gasket 161 sets the distance "d" between the top electrode substrate 101 and the bottom electrode substrate 121. The height of the gasket 161 can be adjusted to obtain the best measurement resolution. In an example, the height of the gasket 161 can be from 1 nm to 1 cm. The gasket 161 is formed along the periphery of the top substrate 101 or bottom substrate 121, separating the top electrode substrate 101 and the bottom electrode substrate 121. The gasket 161 can be a plurality of individual spacers disposed around the periphery of one of the top electrode substrate 101 and the bottom electrode substrate 121 and any number of spacers can be used for increased mounting stability of the top electrode substrate 101 The gasket 161 can be deposited on one of the electrode substrates 101, 121 before the top electrode substrate 101 and the bottom electrode substrate 121 are assembled.

Gasket 161 can be made from a rigid material having a high tensile strength. In one embodiment, the gasket 161 may be made of a ceramic. Exemplary ceramics include, but are not limited to, $TiO_2$, $Ta_2O_5$, $BaTiO_3$, $SrTiO_3$, $PbZrTiO_3$, $LiNbO_3$, $PbMgTiO_3$, and $PbMgNbO_3$. In another embodiment, the gasket 161 may be made of a polymer. Exemplary polymers include, but are not limited to, epoxies, polyimides, polyurethanes, parylene, polysulfones, polysulfides, benzylcyclobutenes (BCBs), nylons, polyvinylidene fluoride (PVDF), and phenolic. In yet another embodiment, the gasket 161 may be made of insulators commonly used in microelectronic fabrication such as, for example, various oxides or nitrides, or are made of conductors that are insulated coated such as, for example copper or aluminum passivated by oxide or nitride layers.

The gasket 161 can be formed by methods known in the art. In an embodiment, the gasket 161 can be formed from mirror twins of a solder material with a first gasket (not shown) formed on one of the top electrode substrate 101 and the bottom electrode substrate 121 and a second gasket (not shown) formed on another one of the top electrode substrate 101 and the bottom electrode substrate 121. Exemplary solder materials that can be employed in the present application include, but are not limited to, tin/copper, tin/silver (which high concentration of silver), tin/gold, SAC (tin with small percentages of aluminum and copper), and nickel with SAC. During the assembly process, once the first gasket and the second gasket are mated, the solder material is reflowed to provide the gasket 161. In another embodiment, the gasket 161 may be formed via mechanical interlock. For example, a double hump-shaped gasket (not shown) may be formed on one of the top electrode substrate 101 and the bottom electrode plate 121, and a single hump-shaped gasket may be formed on one of the top electrode substrate 101 and the bottom electrode substrate 121. Upon mating, the double hump-shaped gasket is forced to straddle and lock onto the single hump-shaped gasket by applying tension to the double hump-shaped gasket, thereby bonding the top electrode substrate 101 and the bottom electrode substrate 121. In yet another embodiment, the gasket 161 may be simply provided by forming an epoxy gasket on the bottom electrode substrate 121.

The gasket 161 may also be used to assure fluid containment within the opening or channel after a fluid medium containing a particular analyte is introduced into the channel. Although not shown, the top electrode substrate 101 may also include one or more through holes (not shown) through which the fluid medium can be introduced into the channel.

Figure 11:
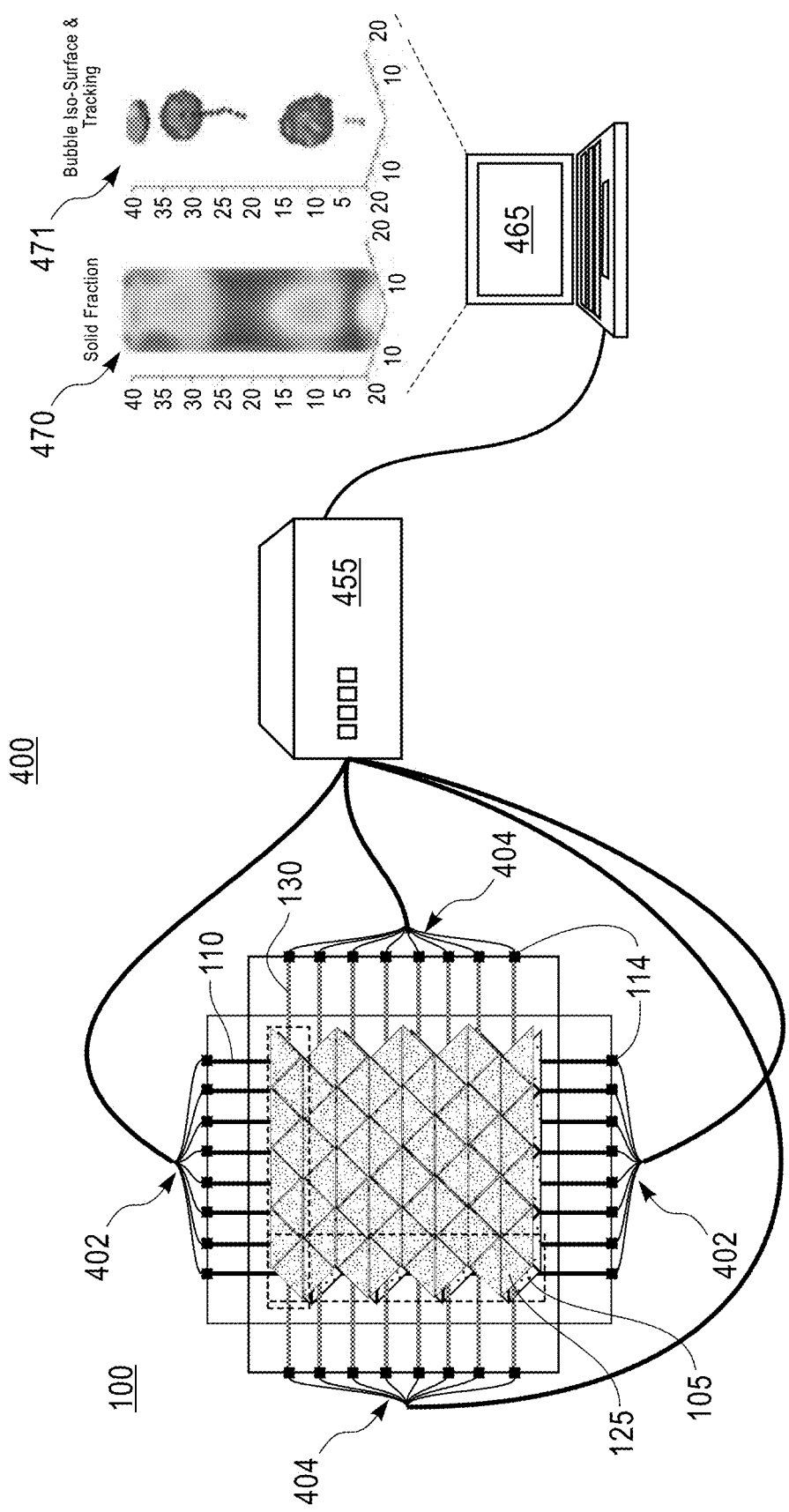
FIG. 11 shows a system for sensing an analyte according to an embodiment of the present application employing an integrated microcapacitive sensing circuit.

FIG. 11 shows a micro-capacitive, multiple channel sensing circuit and instrumentation system 400 for sensing and monitoring movement of nanoparticle material or organisms according to an embodiment. As shown in FIG. 11, a micro-capacitive sensing circuit and data acquisition system 455 including circuitry configured to sense presence and/or movement of analytes is operatively connected to an assembled microcapacitor sensor such as the assembled microcapacitor sensor array structures 100 in the exemplary embodiment of FIG. 4, the assembled microcapacitor sensor sensing structure 200 of FIG. 6 or the assembled microcapacitor sensor sensing structure 300 of FIG. 9.

In the system 400 of FIG. 11, the capacitive sensing circuit and data acquisition system 455 is operatively connected to assembled micro-capacitor sensor structure 100 using electric circuit conductive wire connections 402, 404 that connect to both ends of each of the external conductive signal lines 110, 130, respectively, through respective terminal connections such as terminal pads 114. An individual electric lead wire 402 connects to a respective individual conductive signal or external conductive trace line 110 that contacts the triangular-shaped planar electrodes through respective thru via connections along a respective column of electrodes 105. Similarly, each individual electric lead wire 404 connects to a respective individual conductive signal or external conductive trace line 130 that contacts the triangular-shaped planar electrodes through respective thru via connections along a respective row of electrodes 125.

The capacitive sensing circuit 455 includes a sensing and instrumentation circuit to sense electrical signals having characteristics, e.g., voltage, that is used to detect a change in permittivity of the media due to the presence of an analyte (particle or organism) in the media sensed between successive pairs of top planar electrode 105 and aligned bottom electrodes 125 and record these voltage changes over time. In an embodiment, a computer or image processing unit 465 is connected to the data acquisition unit 455 for data/image processing.

In one embodiment and as shown in FIG. 11, the capacitive sensing circuit 455 is capable of performing a time sequence of capacitance measurements to one electrode relative to all the other electrodes. The capacitive sensing circuit typically includes a plurality of subcircuits (not shown) that are bonded to the top and bottom terminal pads 114 through I/O pins (not shown). The top electrodes 105 and the bottom electrodes 125 can thus be grouped in different fashions through the subcircuits. When measuring the capacitance, the capacitive sensing circuit 455 can provide an alternating current (AC) excitation or a direct current (DC) excitation. The DC excitation may include a path to ground (GND). The integrated sensing circuit allows connecting top electrodes 105 and bottom electrodes 125 with fewer leads, thus can improve signal-to-noise ratio, reduce the number of inputs/outputs and eliminate the need of using external circuitry for performing the same function.

In one embodiment, the capacitive sensing circuit includes respective subcircuits (not shown) including a first sub-circuit enabling connections to a respective first set of bottom terminal pads 114 located at first ends of the conductive lines connecting bottom electrodes 125, a second sub-circuit enabling connections to a respective second set of bottom terminal pads 114 located at second ends of the lines connected to bottom electrodes 125 that is opposite from the first ends, a third sub-circuit enabling connections to a respective first set of the top terminal pads 114 located at first ends of the top electrodes 105 and a fourth sub-circuit enabling connections to a respective second set of the top terminal pads 114 located at second ends of the top electrodes 105. Such an arrangement allows independently acquiring signals from the subcircuits which provides great flexibility in data acquisition. In this case, the number of independent capacitance measurements available is n/2 for a total number of n electrodes.

Although not shown, each respective subcircuit can include a pair of multiplexers (mux) coupled to an instrumentation amplifier. In one embodiment, the instrumentation amplifier which can be a capacitance sense amplifier for AC or DC differential capacitance sensing or a two-lead (+/−) or a three-lead (+/−/GND) hook-up. In another embodiment, the instrumentation amplifier may be a current amplifier for quasi-static capacitance measurements or resistive measurement.

For sensor operations using any of the microcapacitor sensor embodiments of FIGS. 4, 6 and 9, introduced between the top substrate 101 and bottom substrate 121 is an analysis medium (e.g., a fluid such as water or other liquids or liquid mixtures such as emulsions (oil droplets dispersed in water), mixtures of immiscible liquid chemicals) within which contains an analyte (particle or organism) whose movement is tracked. As an example, an organism like a bacteria or virus moves in a fluid medium and responsive to a movement between a pair of aligned electrodes, e.g., electrodes 105, 125, the dielectric permittivity between the two aligned electrodes will change. In FIG. 11, the sensing or tracking of particle or organism movement for 2D sensing requires a detecting of a change in permittivity at the processor 455 at two or more successive multiple pairs of two aligned electrodes 105, 125. That is, for 2D sensing, as a particle or organism traverses successive aligned pairs of electrodes 105, 125 in the medium, the multiple channel sensing circuit and instrumentation system 400 detects the change in the dielectric permittivity as signals conveyed via signal lines 402, 404 at each of the successive aligned pairs of electrodes 105, 125.

For the multiple channel 2D sensing, quasi-static field distributions are assumed, i.e., signal frequency is sufficiently low so that displacement currents can be ignored. It is further assumed that Poisson's equation determines the electric field distribution inside the imaging domain, and the wavelength of operation is much larger than any of the linear dimensions of the imaging domain. The sensitivity matrix of a capacitance sensor is a map of capacitance variations with respect to a set of discrete dielectric perturbations in the imaging domain.

The capacitance of the sensor depends on the dielectric permittivity of medium between the aligned pair of capacitor sensor electrodes 105, 125. The actual capacitance (Ca) due to liquid sample is in series with 2D glass (or other material) slide capacitance (Cs).

Therefore the total capacitance (Ct) of the sensor can be expressed according to equation 1) as:

$$Ct = C_a C_s / (C_a + C_s) \qquad (1)$$

The capacitance of the glass (or other material) side is dependent on the dielectric material of the glass (or other material) and is a constant, while the actual capacitance due to liquid sample is proportional to the dielectric constant of the liquid and solid filling the volume between the two glass (or other material) slides.

The effective permittivity ($\varepsilon_a$) of the host liquid and nanoparticle(s) depends on the volume percentage of the two according to equation 2) as follows:

$$\varepsilon_a = (V_1 \varepsilon_1 + V_p \varepsilon_p)/V_t \qquad (2)$$

Where $V_l$, $V_p$, $V_t$ is the volume of the liquid, the nanoparticle(s) and the total volume, respectively, and $\varepsilon_l$, $\varepsilon_p$ are the dielectric permittivity of the liquid and nanoparticle(s), respectively.

If the sensor electrodes are in direct contact with the liquid sample (no 2D glass (or other material) slide, then the total Capacitance is according to equation 3) as follows:

$$C_t = C_a = \varepsilon_a A/d \qquad (3)$$

where A, d is the electrode area and separation distance d.

Further, for the multiple channel 2D sensing, it is assumed that the analyte particles undergo Brownian motion. Thus, as shown in the following equation 4):

$$\Delta t \approx 1/D (1/An_a)^2 \qquad (4)$$

where D is defined as a diffusion constant, A is the active capacitive electrode area, and $n_a$ is the number of analyte molecules (nanoparticles) per unit volume. One could potentially detect a signal due to the presence of tens to hundreds of molecules using a single sensor. However, in a typical dilute ($n_a$~small) mixture, it would take an unacceptably long tine ($\Delta t$~large) for an analyte molecule to come transit from one electrode area into another electrode area (to detect motion). In an aspect of the invention, this is overcome by employing an array of small electrodes distributed over space operating in parallel. For the n/2 electrode array of paired electrodes working in parallel, the corresponding detection time is roughly scaled down by 2/n, retaining the sensitivity amount of time for collection the information from all the array elements. For the n/2 electrode pairs, there are n connections and n detection circuits (or alternatively, n/m when detection circuits are multiplexed m times.

Scanning of capacitive sensor array 100 is thus based on differential capacitance measurements of pairs of intersecting top electrodes 105 and bottom electrodes 125. Since the top electrodes 105 and the bottom electrodes 125 are separated by the spacers or gasket 161, the system of the present application allows 3D image sensing across the top electrode substrate 101 and the bottom electrode plate 121. In addition, by measuring differential capacitance among pairs of intersecting aligned top electrodes 105 and bottom electrodes 125, it also eliminates the effect of the parasitic capacitance.

In view of FIG. 11, multiple sensed electrical signal characteristics based on the differential capacitance values are processed in system 400 to identify, image or track movement of the analyte over time at a display imaging device 465 operatively connected to the data acquisition circuit 455 to allow reconstruction and viewing of sensed particle or organism analytes. Example reconstructed images corresponding to detected movement of an analyte are shown as respective images 470, 471.

In operation, using the system of FIG. 11, a measurement process using the exemplary capacitive sensor arrays 100, 200, 300 of the present application to monitor movements of analytes can include introducing a fluid solution or medium having analytes into the channel that is defined by peripheral gasket 161. In one embodiment, the fluid solution or medium can be introduced into the channel via through holes under vacuum. The self-assembling material solution can be introduced by flowing the solution into one through hole and flow out from another through hole (not shown). Alternatively, the self-assembling material solution can be introduced by subjecting the through holes to a vacuum followed by backfilling the through holes with the fluid solution or medium. In yet another embodiment, the self-assembling material solution can be introduced into the cavity before the top electrode substrate 101 is assembled to the bottom electrode substrate 121. Then, capacitance across the electrode pairs over the entire capacitive sensor array (100, 200 or 300) is measured. The capacitance can be measured between neighboring electrodes in the same electrode plate (e.g., either the top electrode substrate 101 or the bottom electrode substrate 121) or between intersecting top and bottom electrodes 105, 125 in the top electrode substrate 101 and the bottom electrode substrate 121. Then, the capacitance change across the capacitive sensor array is monitored. By recording the capacitance of electrode pairs over time, a 2D map of the capacitance of the entire capacitive sensor array can be generated. Any capacitance change between electrode pairs indicates presence of analyte. The capacitance of the electrode pairs of the entire capacitive sensor array is recorded over time. In one embodiment and for example, the dynamics of movement of an organism can be obtained from the capacitance changes between the electrode pairs at different locations.

Thus, aspects of the present invention provide a microsensor that images a dielectric permittivity flow change with a simpler 2D (in plane) placement of electrode sensors and is applicable for monitoring very small ((nanoparticle<200 nm) movement. This includes molecules, bio markers, etc. movement tracking. These simpler 2D placement of electrodes need only n/2 independent capacitance measurements to image movement.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A micro-capacitive sensor comprising:
   a first two-dimensional (2D) array of non-contacting conductive electrodes in a first electrode plane, each conductive electrode of the first 2D array having a triangular shape,
   a second 2D array of non-contacting conductive electrodes in a second electrode plane, each second conductive electrode of the second 2D array having a triangular shape, wherein said first electrode plane and said second electrode plane are parallel, wherein each conductive electrode of the first 2D array is aligned with a corresponding conductive electrode of the second 2D array and wherein the first 2D array and the second 2D array are separated to define a channel therebetween for sensing an analyte material between said first electrode plane and said second electrode plane.

2. The micro-capacitive sensor according to claim 1, further comprising one or more dielectric materials between first electrode plane and second electrode plane.

3. The micro-capacitive sensor according to claim 1, further comprising:
   a first electrically insulating substrate upon which is formed said first 2D array of non-contacting conductive electrodes in the first electrode plane;
   a second electrically insulating substrate upon which is formed said second 2D array of non-contacting conductive electrodes in the second electrode plane; and
   a sealing structure formed at peripheral surfaces of said first and second electrically insulating substrates to couple the first electrically insulating substrate to the second electrically insulating substrate and allow for a separation to define said channel.

4. The micro-capacitive sensor according to claim 3, wherein the insulating substrates comprise one or more of: glass, plastic or organic printed circuit boards.

5. The micro-capacitive sensor according to claim 3, further comprising:
   a respective single conductive signal line contacting each of the non-contacting conductive electrodes along a respective single row or a respective single column of said first 2D array of non-contacting conductive electrodes; and
   a respective single conductive signal line contacting each of the non-contacting conductive electrodes along a respective single column or respective single row of said second 2D array of non-contacting conductive electrodes.

6. The micro-capacitive sensor according to claim 5, wherein the first electrically insulating substrate has a first surface upon which said first electrode plane of said first 2D array of non-contacting conductive electrodes is formed and a second surface upon which said respective single conductive signal line is formed, said structure further comprising:
   a respective conductive thru via structure having a first end contacting a respective conductive electrode formed on the first surface and a second end contacting the respective single conductive signal line formed on the second surface.

7. The micro-capacitive sensor according to claim 5, wherein the second electrically insulating substrate has a first surface upon which said second electrode plane of said second 2D array of non-contacting conductive electrodes is formed and a second surface upon which said respective single conductive signal line is formed, said structure further comprising:
   a respective conductive thru via structure having a first end contacting a respective conductive electrode formed on the first surface and a second end contacting the respective single conductive signal line formed on the second surface.

8. The micro-capacitive sensor according to claim 5, wherein said respective single conductive signal line contacting each of the non-contacting conductive electrodes of said first 2D array and said respective single conductive signal line contacting each of the non- contacting conductive electrodes of said second 2D array further connect to a processing circuit for sensing a movement of the analyte material between said first electrode plane and said second electrode plane, said processing circuit measuring a capacitance change between any aligned pair of a conductive electrode of said first 2D array and corresponding aligned conductive electrode of the second 2D array.

9. The micro-capacitive sensor according to claim 8, wherein the first plane electrodes and the second plane electrodes produce n/2 independent capacitance measurements for a total of n electrodes.

10. The micro-capacitive sensor according to claim 3, further comprising:
    a respective first single conductive signal line contacting a plurality of the non-contacting conductive electrodes along a respective single row or a respective single column of said first 2D array of non-contacting conductive electrodes, and a respective second single conductive signal line contacting a remaining plurality of the non-contacting conductive electrodes along the same respective single row or a respective single column of said first 2D array of non-contacting conductive electrodes; and a respective first single conductive signal line contacting a plurality of the non-contacting conductive electrodes along a respective single column or respective single row of said second 2D array of non-contacting conductive electrodes, and a respective second single conductive signal line contacting a remaining plurality of the non-contacting conductive electrodes along the same respective single column or a respective single row of said first 2D array of non-contacting conductive electrodes.

11. The micro-capacitive sensor according to claim 3, further comprising:

a respective set of a plurality of conductive signal lines contacting each of the non-contacting conductive electrodes along a respective single row or a respective single column of said first 2D array of non-contacting conductive electrodes; and a respective set of a plurality of conductive signal line contacting each of the non-contacting conductive electrodes along a respective single column or respective single row of said second 2D array of non-contacting conductive electrodes.

12. The micro-capacitive sensor according to claim 1, wherein the non-contacting conductive electrodes in each said first electrode plane and second electrode plane comprise a transparent conductive film.

13. A system for sensing analyte materials in a medium, the system comprising:

a micro-capacitive sensor comprising:

a first two-dimensional (2D) array of non-contacting conductive electrodes in a first electrode plane, each conductive electrode of the first 2D array having a triangular shape;

a second 2D array of non-contacting conductive electrodes in a second electrode plane, each second conductive electrode of the second 2D array having a triangular shape, wherein said first electrode plane and said second electrode plane are parallel, wherein each conductive electrode of the first 2D array is aligned with a corresponding conductive electrode of the second 2D array and wherein the first 2D array and the second 2D array are separated to define a channel therebetween;

one or more respective conductive signal lines contacting each of the non-contacting conductive electrodes along a respective single row or a respective single column of said first 2D array of non-contacting conductive electrodes; and a respective one or more respective conductive signal lines contacting each of the non-contacting conductive electrodes along a respective single column or respective single row of said second 2D array of non-contacting conductive electrodes;

a sensing circuit connected to each of said one or more respective conductive signal lines contacting each of the non-contacting conductive electrodes of said first 2D array and further connected to each of said one or more respective conductive signal lines contacting each of the non-contacting conductive electrodes of second 2D array, and adapted for performing capacitance measurements between any pair of aligned electrodes through the channel.

14. The system as claimed in claim 13, further comprising:

a processor connected to said sensing circuit for constructing a movement image of the analyte materials in the channel, said movement image constructed from a change of capacitance measurements.

15. The system as claimed in claim 14, wherein the sensing circuit is adapted to vary a voltage amplitude, frequency, waveform shapes and a timing between the waveform shapes, and an order of addressing the electrodes.

16. A method of manufacturing a micro-capacitive sensor comprising:

providing a first insulating substrate;

forming on a surface of the first insulating substrate, a first two-dimensional (2D) array of first conductive electrodes, each first conductive electrode of the first 2D array having a triangular shape;

forming, on an opposing surface of the first insulating substrate, a respective conductive signal line corresponding to a respective column of first conductive electrodes of the first 2D array, a respective conductive signal line connecting to one or more of the first capacitor electrodes along the respective column of the first 2D array by a respective via connection formed through the first insulating substrate;

providing a second insulating substrate;

forming on a surface of the second insulating substrate, a second two-dimensional (2D) array of second conductive electrodes, each second conductive electrode of the second 2D having a triangular shape;

forming, on an opposing surface of the second insulating substrate, a respective conductive signal line corresponding to a respective row of second conductive electrodes of the second 2D array, a respective conductive signal line connecting to one or more of the second capacitor electrodes along the respective row of the second 2D array by a respective via connection formed through the second insulating substrate; and joining, using an insulator material, the first insulating substrate and the second insulating substrate such that first conductor electrodes of the first 2D array of capacitor electrodes is aligned with corresponding second conductor electrodes of the second 2D array and the first 2D array and the second 2D array are separated to define a channel therebetween.

17. The method as claimed in claim 16, wherein the forming, on an opposing surface of the first insulating substrate, a respective conductive signal line further comprises forming multiple conductive signal lines corresponding to a respective column of first electrodes of the first 2D array, each of the multiple conductive signal lines corresponding to a respective column connecting to one or more of the first capacitor electrodes along that respective column of the first 2D array by a respective via connection formed through the first insulating substrate.

18. The method as claimed in claim 16, wherein the first conductive electrodes and the second conductive electrodes are adapted to produce n/2 independent capacitance measurements for a total of n electrodes.

* * * * *